US008720086B2

(12) United States Patent
Auger et al.

(10) Patent No.: US 8,720,086 B2
(45) Date of Patent: May 13, 2014

(54) CLEAT MEMBER FOR ARTICLE OF FOOTWEAR

(75) Inventors: Perry W. Auger, Tigard, OR (US); Paul Hooper, Vancouver, WA (US); Sergio Cavaliere, Venice (IT); Andrew Caine, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 666 days.

(21) Appl. No.: 12/052,035

(22) Filed: Mar. 20, 2008

(65) Prior Publication Data
US 2009/0235558 A1    Sep. 24, 2009

(51) Int. Cl.
A43B 13/14    (2006.01)
A43C 15/16    (2006.01)
A43C 15/00    (2006.01)

(52) U.S. Cl.
CPC ............. *A43C 15/167* (2013.01); *A43C 15/162* (2013.01)
USPC .............. 36/134; 36/67 A; 36/30 R

(58) Field of Classification Search
CPC ....................... A43C 15/162–15/167
USPC ............ 36/134, 30 R, 59 R, 61, 62, 65, 67 A, 36/67 D, 67 R
See application file for complete search history.

(56) References Cited

U.S. PATENT DOCUMENTS

| | | | |
|---|---|---|---|
| 2,083,177 A | 6/1937 | Wimmenauer | |
| 2,087,634 A | 7/1937 | Wimmenauer | |
| D271,159 S | 11/1983 | Muller-Feigelstock | |
| 4,445,288 A * | 5/1984 | Fror | 36/134 |
| 4,593,482 A * | 6/1986 | Mayer | 36/7.5 |
| 4,864,738 A * | 9/1989 | Horovitz | 36/29 |
| 5,027,532 A | 7/1991 | MacNeill et al. | |
| 5,123,184 A * | 6/1992 | Ferreira | 361/34 |
| 5,361,518 A * | 11/1994 | Sussmann et al. | 36/134 |
| 5,473,827 A * | 12/1995 | Barre et al. | 36/134 |
| D368,360 S | 4/1996 | Wolfe | |
| 5,832,636 A | 11/1998 | Lyden et al. | |
| 5,848,482 A * | 12/1998 | Bathum | 36/127 |
| D408,619 S | 4/1999 | Worthington et al. | |
| 5,960,568 A * | 10/1999 | Bell et al. | 36/134 |
| 6,101,746 A | 8/2000 | Evans | |
| 6,145,221 A | 11/2000 | Hockerson | |

(Continued)

FOREIGN PATENT DOCUMENTS

| | | |
|---|---|---|
| GB | 2366508 A | 3/2002 |
| JP | 11137305 A | 5/1999 |
| JP | 2002306207 A | 10/2002 |
| WO | 2006122832 A2 | 11/2006 |

OTHER PUBLICATIONS

Prior 2 Lever Football Boots—The Interview Parts I, II and III, Footy-boots.com, Printed from Internet on Jul. 11, 2007, pp. 1-10. http://www.footy-boots.com/category/prior-2-lever/.

(Continued)

*Primary Examiner* — Jila M Mohandesi
(74) *Attorney, Agent, or Firm* — Banner & Witcoff, Ltd

(57) ABSTRACT

A cleat member is provided for use with an article of footwear. The cleat member includes an outer layer formed from a first material and an inner layer formed from a second material. The inner layer is at least partially encapsulated by the outer layer. The first material is distinct from the second material. A hole extends completely through the cleat member.

23 Claims, 12 Drawing Sheets

(56) References Cited

U.S. PATENT DOCUMENTS

| | | | |
|---|---|---|---|
| 6,233,850 | B1 | 5/2001 | Peabody |
| 6,260,292 | B1* | 7/2001 | Swedick et al. ............... 36/134 |
| 6,722,061 | B2* | 4/2004 | Auger et al. .................. 36/136 |
| 6,754,984 | B2 | 6/2004 | Schaudt et al. |
| 6,826,852 | B2 | 12/2004 | Fusco |
| 6,941,684 | B2* | 9/2005 | Auger et al. .................. 36/136 |
| 6,957,503 | B2* | 10/2005 | De Paoli ..................... 36/67 D |
| 7,076,890 | B2* | 7/2006 | Grove et al. ................... 36/15 |
| 7,143,530 | B2 | 12/2006 | Hudson et al. |
| 2002/0174571 | A1* | 11/2002 | Briant et al. .................. 36/134 |
| 2005/0252038 | A1* | 11/2005 | Braunschweiler ............... 36/28 |
| 2006/0021255 | A1 | 2/2006 | Auger et al. |
| 2007/0107267 | A1 | 5/2007 | Hodgson |
| 2009/0185853 | A1 | 7/2009 | Koelling et al. |

OTHER PUBLICATIONS

International Search Report and Written Opinion issued Jul. 20, 2009 in corresponding PCT Application No. PCT/US2009/037601.

Office Action issued Mar. 14, 2011 in related European Patent Application No. 09722803.5.

Office Action issued Dec. 1, 2011 in Chinese Patent Application No. 200980109782.X, and English translation thereof.

European Search Report, issued Jun. 25, 2013, in corresponding European Patent Application No. 13158754.5.

Office Action issued on Feb. 14, 2013 in European Application No. 09722803.5.

* cited by examiner

CLEAT MEMBER FOR ARTICLE OF FOOTWEAR

FIELD OF THE INVENTION

The present invention relates to a cleat member and an article of footwear having one or more cleat members, and in particular, to a cleat member designed for lightweight stability.

BACKGROUND OF THE INVENTION

Modern articles of footwear, such as athletic shoes, are a combination of many elements working together for the support and protection of the foot and the enhancement of athletic abilities. In general, an athletic shoe is divided into two parts: an upper and a sole. The upper is designed to snugly and comfortably enclose the foot. The sole is designed to attenuate ground reaction forces (i.e. imparts cushioning) and provide a broad, stable base to support the foot during ground contact. Typically, the sole structure of athletic footwear includes multiple layers, for example, a comfort-enhancing insole, a resilient midsole, and a ground-contacting outsole that provides both abrasion-resistance and traction. Additional traction, which may be attained by providing the outsole with cleat members, is desirable for certain sports, for example, football, baseball and soccer.

Cleat members have traditionally been molded with natural materials, such as rubber, or synthetic materials, such as high abrasion thermoplastic polyurethanes ("TPUs"). TPUs commonly used in such applications have a Shore A hardness of about 80 to 100, as measured by ASTM Method D-2240-91. Representative useful TPUs are sold by the Bayer Corporation under the trademarks TEXIN™ and DESMOPAN™. However, such cleat members tend to be either too soft and unstable or, if made of a suitable material and size so as to have sufficient strength and stability, they tend to be too heavy.

Cleat members may be formed of one-piece molded construction with the sole. Alternatively, cleat members may be removably secured to the sole, such as by a threaded member extending from the cleat member that is received by a threaded member in the sole.

It is an object of the present invention to provide a cleat member and an article of footwear including such a cleat member that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY OF THE INVENTION

The present invention is generally directed to a cleat member having a first element and a second element at least partially encapsulated within said first element.

In one aspect, a cleat member is provided for use with an article of footwear. The cleat member includes an outer layer formed from a first material and an inner layer formed from a second material. The inner layer is at least partially encapsulated by the outer layer. The first material is distinct from the second material. A hole extends completely through the cleat member.

According to one embodiment, the first material is a translucent thermoplastic polyurethane and the second material is one of a colored thermoplastic polyurethane and a colored nylon. The second material may be fiber reinforced and include from approximately 5 to 50 wt. % glass fiber, inclusive, more narrowly from approximately 15 to 30 wt. % of glass fiber.

In another aspect, a cleat member includes an encapsulation layer formed from the encapsulation material and at least one core element formed from one or more core materials. The core element(s) form a core layer. The core layer is at least partially encapsulated by the encapsulation layer, the core material(s) is distinct from the encapsulation material. At least one of the encapsulation layer or the core layer defines a first aperture.

According to one embodiment, the aperture may be at least partially filled with the encapsulation material.

In another aspect, an article of footwear is provided. The footwear includes an upper, a sole attached to the upper and at least one cleat member extending from the sole. The cleat member includes an outer layer formed from a first material and an inner layer formed from a second material. The inner layer is at least partially encapsulated by the outer layer. The first material is distinct from said second material. A hole extends through the cleat member.

In yet another aspect, a ground engaging member for use with an article of footwear is provided. The ground engaging member includes a base plate in the shape of at least a portion of a footprint and a cleat frame configured to extend generally around at least a portion of said base plate. The cleat frame includes at least one cleat member extending from a cleat frame base. The cleat member includes an outer layer formed from a first material and an inner layer formed from a second material. The inner layer is at least partially encapsulated by the outer layer. The first material is distinct from said second material. A hole extends through the outer layer and the inner layer.

In one embodiment of the ground engaging member the cleat frame base is co-molded with the outer layer of the cleat member or co-molded with the inner layer of the cleat member.

Substantial advantage is achieved by providing a cleated article of footwear in as described herein. In particular, certain preferred embodiments of the present invention can produce a stiffer, more stable, lighter weight cleat member. Moreover, greater design flexibility is achieved due to the greater number of design parameters that can be varied, thereby leading to cleat members that can be efficiently designed for many different applications.

These and additional features and advantages of the invention disclosed herein will be further understood from the following detailed disclosure of certain preferred embodiments.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

Figure 1:
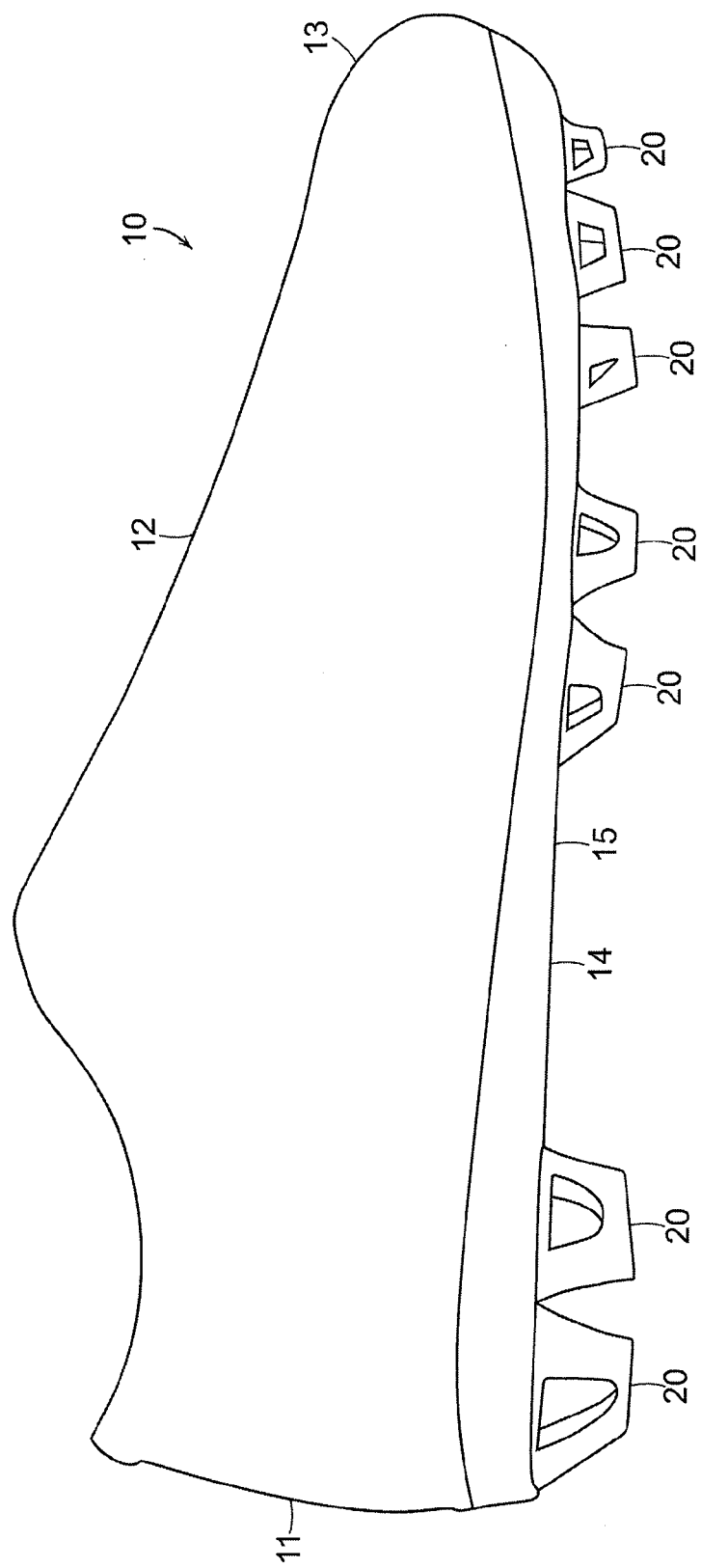
FIG. 1 is a lateral side elevational view of an article of footwear provided with a plurality of cleat units according to an embodiment of the present invention.

The figures referred to above are not necessarily drawn to scale and should be understood to provide a representation of the invention, illustrative of the principles involved. Some features of the cleat members and/or the article of footwear depicted in the drawings may have been enlarged or distorted relative to others to facilitate explanation and understanding. The same reference numbers are used in the drawings for similar or identical components and features shown in various alternative embodiments. Cleat members and articles of footwear as disclosed herein would have configurations and components determined, in part, by the intended application and environment in which they are used.

DETAILED DESCRIPTION OF THE PREFERRED EMBODIMENTS

The present invention utilizes a two-layered cleat member design that better controls the stiffness, stability and weight properties of individual cleat members, thereby providing greater flexibility in the design of the overall stability and traction control for a cleated athletic article of footwear.

The present invention may be embodied in various forms. FIG. 1 is a lateral side elevational view illustrating certain features of one embodiment of a cleated article of footwear, such as a cleated athletic shoe 10. Footwear 10 includes an upper 12 connected to a sole 14. Typically, upper 12 and sole 14 are each made of multiple elements (not shown), with the selection and design of the individual elements being tailored to the particular usage for which the article of footwear is designed. Cleat members 20 are attached to sole 14.

Unless otherwise stated or otherwise clear from the context below, directional terms used herein, such as rearwardly, forwardly, inwardly, downwardly, upwardly, etc., refer to directions relative to the footwear itself. Thus, in the illustrated embodiment of FIG. 1, rearwardly is toward heel portion 11. Forwardly is toward forefoot portion 13. Forefoot portion 13 includes a ball region and a toe region. Downwardly is toward the bottom of the page as seen in FIG. 1. Inwardly is toward the center of footwear 10, and outwardly is toward the outer peripheral edge of footwear 10. Midfoot portion 15 lies between heel portion 11 and forefoot portion 13. Lateral side 17 refers to the side of footwear 10 that is generally oriented on the side facing away from the centerline of the wearer's body. Medial side 19 refers to the side of footwear 10 that is generally oriented on the side facing toward the centerline of the wearer's body.

When referring to the cleat member geometry, unless otherwise stated or otherwise clear from the context below, top refers to the portion of the cleat member that engages the article of footwear. Bottom refers to the portion of the cleat member that engages the ground. Thickness refers to a dimension perpendicular to an axis that runs from the top to the bottom of the cleat member.

Figure 2:
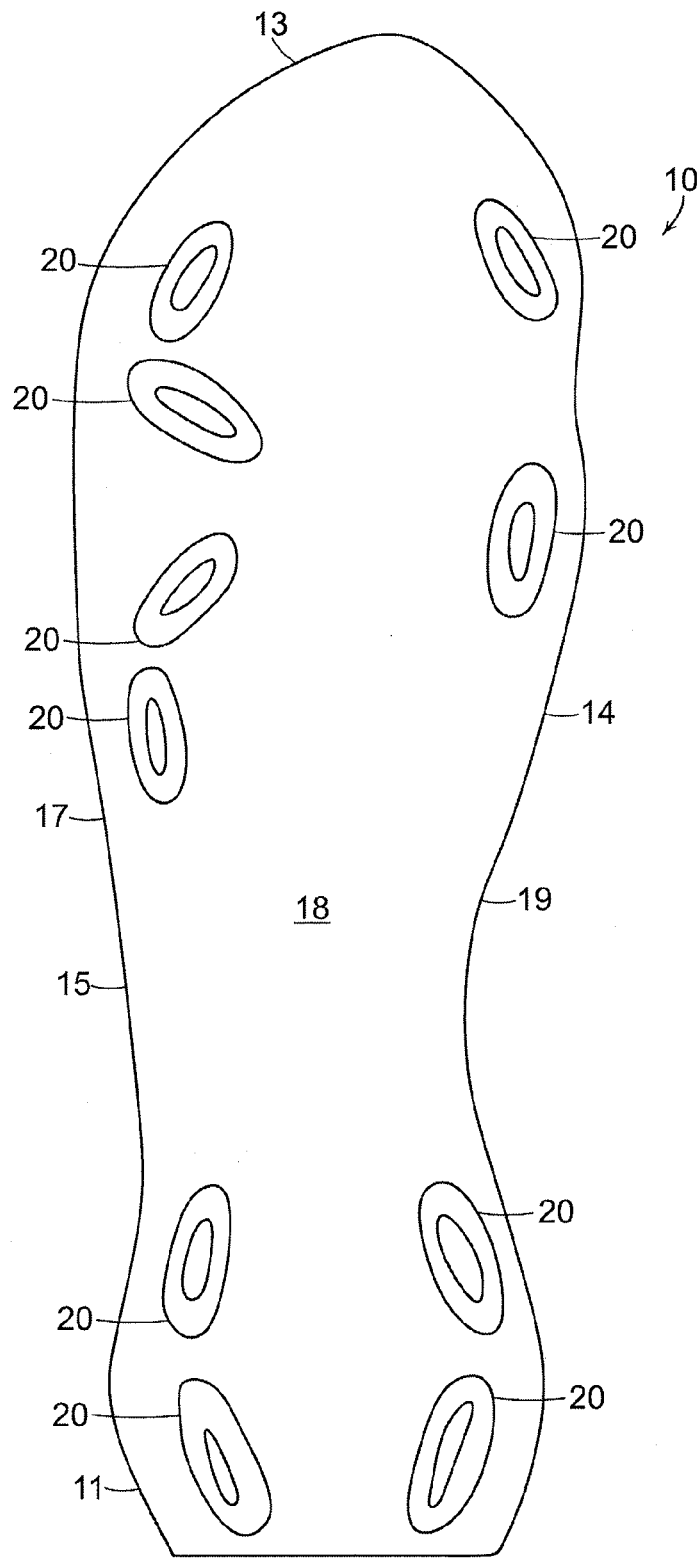
FIG. 2 is a bottom view of an article of footwear provided with a plurality of cleat units according to the embodiment of FIG. 1.

FIG. 2 is a bottom view of a cleated article of footwear according to the embodiment of FIG. 1. In this illustrated embodiment, sole 14 includes a base plate 18. Four cleat members 20 are positioned in heel portion 11 of base plate 18, two on lateral side 17 and another pair on medial side 19. Four cleat members 20 are positioned on base plate 18 in forefoot portion 13 on lateral side 17, three beneath the ball region of a wearer's foot and one beneath the toe region. On the medial side 19 of forefoot portion 13, two cleat members 20 are also positioned—one beneath the ball region and another beneath the toe region. The number of cleat members and their arrangement on the sole are a matter of design choice, which would be dependent upon, among other things, the sport and the type of usage for which the article of footwear is designed. In FIG. 2, the cleat members are arranged individually on base plate 18.

Figure 3:
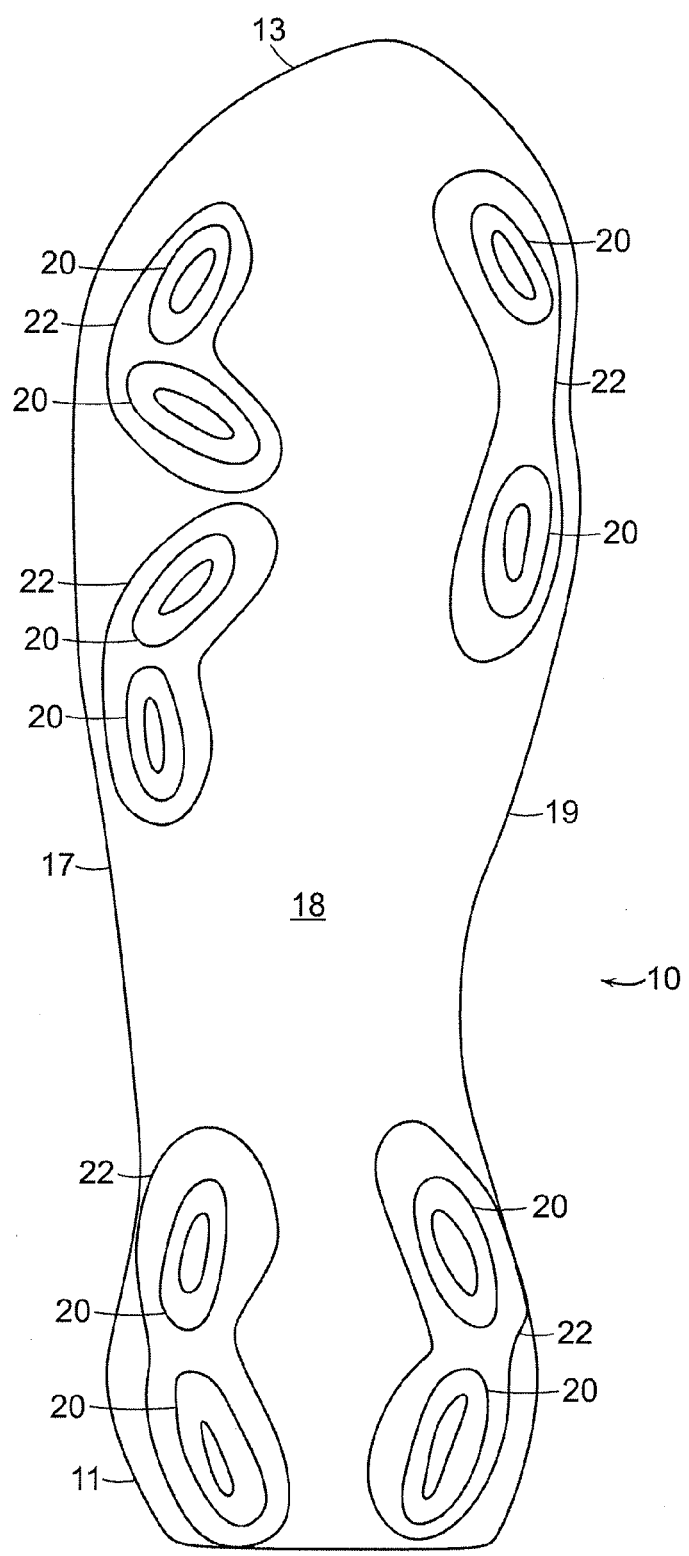
FIG. 3 is a bottom view of an article of footwear provided with a plurality of cleat units according to another embodiment of the present invention.

FIG. 3 is a bottom view of a cleated article of footwear according to another aspect. In this illustrated embodiment, cleat members 20 are coupled together as cleat member assemblies 22. The use of cleat member subassemblies could be used, among other things, to locally increase the stiffness of the article of footwear and also to facilitate the manufacturing and assembling of the cleat members and the article of footwear. The number of cleat members and their arrangement within any cleat member assembly is a matter of design choice. Further, any particular cleated article of footwear may include both individual cleat members and cleat member assemblies. It is to be appreciated that any number of cleat members can be provided on the article of footwear and that the location and orientation of the cleat members described herein are merely exemplary.

Figure 4:
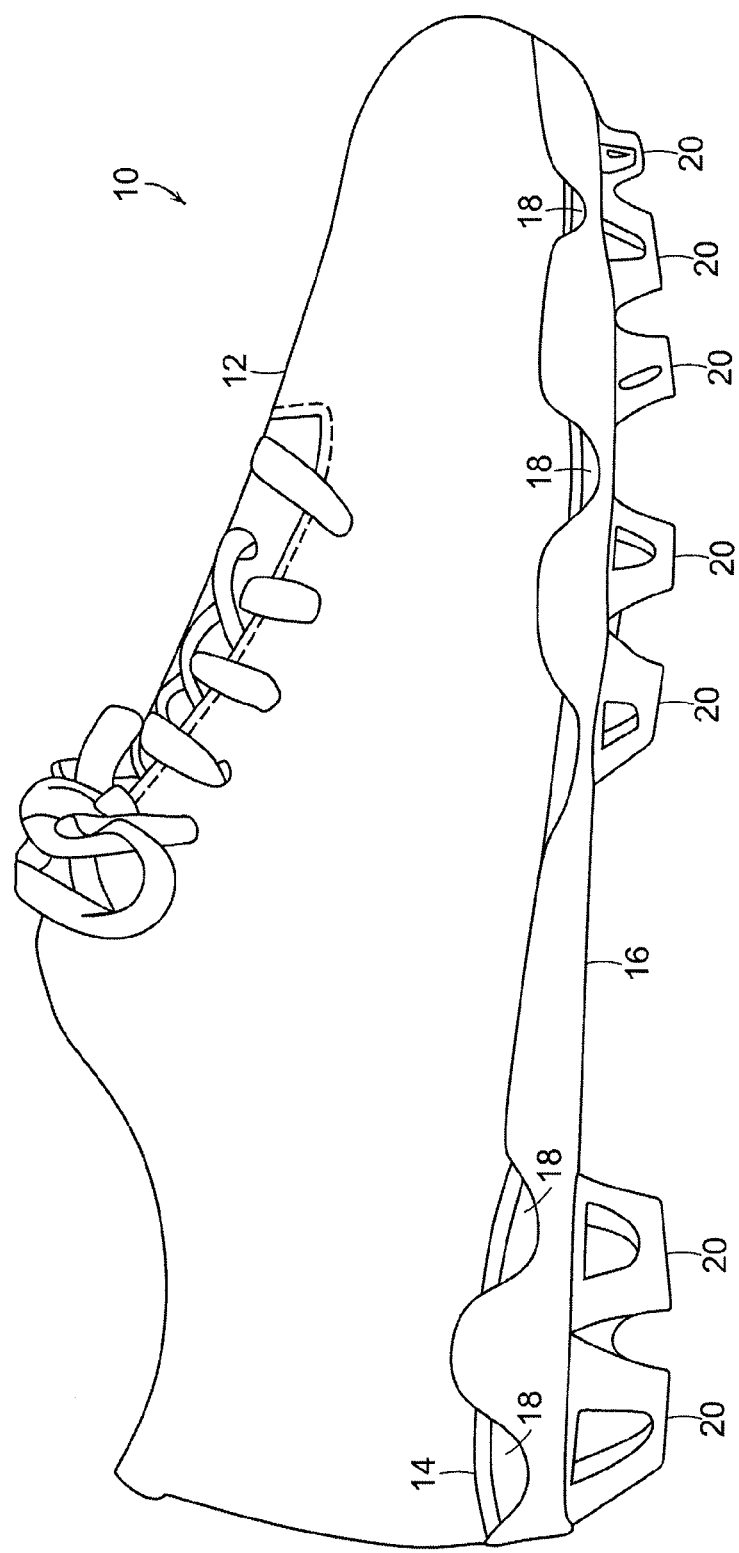
FIG. 4 is lateral side elevational view of an article of footwear provided with a plurality of cleat units according to even another embodiment of the present invention.
Figure 5:
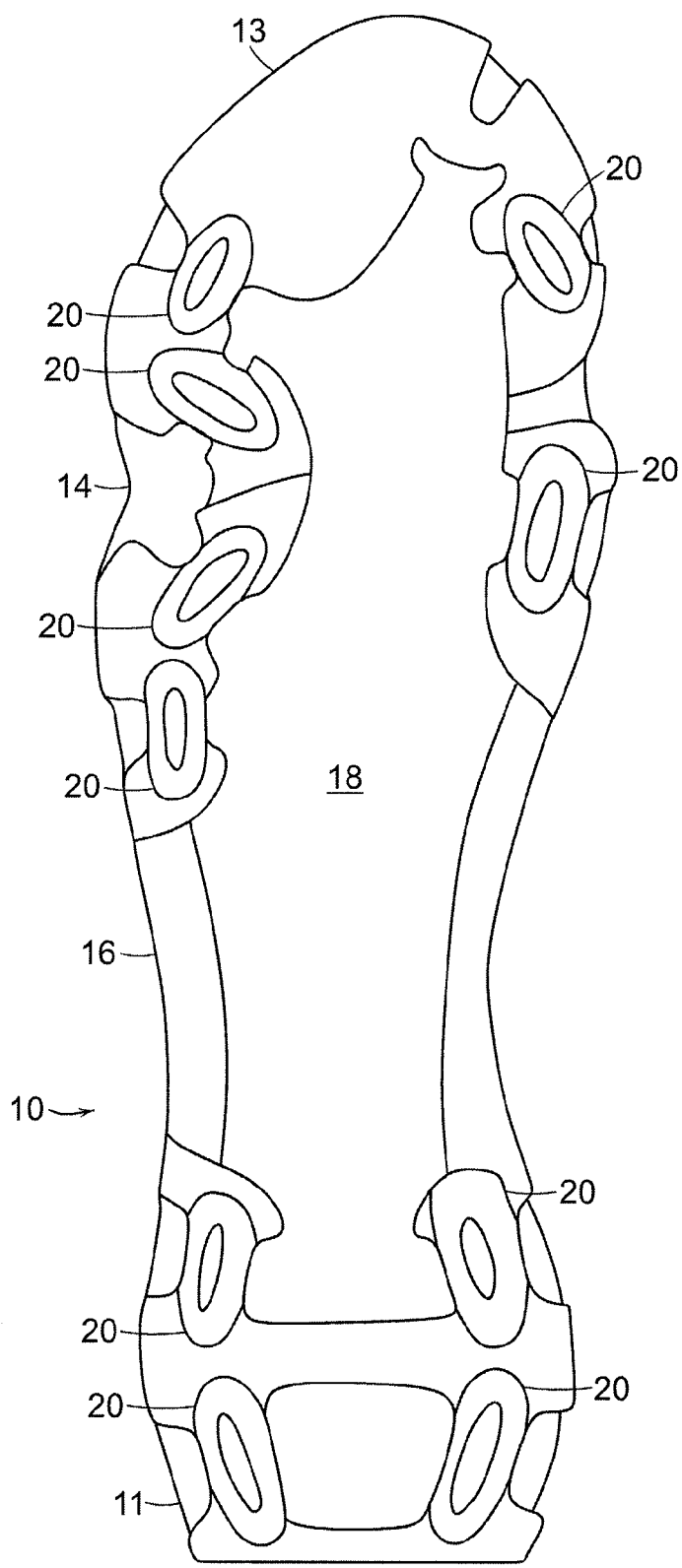
FIG. 5 is a bottom view of an article of footwear provided with a plurality of cleat units according to the embodiment of FIG. 4.

FIGS. 4 and 5 illustrate a lateral side elevational view and a bottom view, respectively, of cleated article of footwear 10 according to another aspect. In this particular embodiment, cleat members 20 are joined to a cleat frame 16 and cleat frame 16 is joined to base plate 18, which forms part of sole 14. Cleat frame 16 generally extends around the perimeter of sole 14. In FIG. 5, cleat frame 16 is shown as generally extending continuously around the perimeter of sole 14. Alternatively, cleat frame 16 may be discontinuous (not shown). By way of non-limiting example, cleat frame 16 may extend from heel portion 11 to forefoot portion 13 on the lateral side 17, across the toe region, and then down from forefoot portion 13 to heel portion 11 on the medial side 17. Is this example, cleat frame 16 does not extend across the heel portion (not shown). As another alternative, cleat frame 16 could generally extend around the perimeter of sole 14 in the forefoot portion 13 or in the heel portion 11. Further, cleat frame 16 could be formed as two pieces, a first piece generally extend around the perimeter of sole 14 in the forefoot portion 13 and a second piece in the heel portion 11, but with the two pieces not connected to one another in the midfoot portion 15 at one or both of the lateral or medial sides (not shown). The use of a cleat frame may improve stiffness and wear characteristics of the article of footwear and facilitate the manufacture and assembly of the cleat members to the article of footwear.

Further, any particular cleated article of footwear may include individual cleat members 20, cleat member assemblies 22, a cleat member frame 16 or a combination thereof. Thus, by way of a non-limiting example, a cleated article of footwear 10 may includes a cleat member frame 16 extending around the forefoot portion 13 and cleat member assemblies 22 in the heel portion 11.

Cleat member 20 is formed of at least two layers. In one aspect, one layer is relatively soft and lightweight and the other layer is relatively stiffer and heavier. By varying the design of the two layers, a relatively light cleat member having sufficient strength and stability for any particular application may be achieved. In another aspect, one layer is visually distinguishable from the other layer, such that an aesthetically interesting cleat member may be achieved.

Referring to FIGS. 6-13B, each cleat member 20 includes an outer or encapsulation layer 24 and an inner or core layer 26. Encapsulation layer 24 is formed from an encapsulation material. Core layer 26 is formed from one or more core elements 28. Core elements 28 making up core layer 26 are formed from one or more core materials. Core layer 26 is at least partially encapsulated by encapsulation layer 24. Cleat member 20 may include a protrusion 27 for engaging sole 14.

The phrase "encapsulation layer," as used herein, refers to a stratum formed of a material that at least partially encapsulates or partially surrounds a core layer formed of material(s) distinct from the material of the encapsulation layer. The thickness of the encapsulation layer, unless otherwise stated or otherwise clear from the context below, refers to the thickness of the layer that wraps around the core layer, i.e. the thickness of a wall of the encapsulation material found on one side of the core layer. Think of the thickness of a blanket wrapped around a person or the thickness of a piece of bread wrapped around a hot dog. A cleat member having a totally encapsulated core layer would include, through the thickness, a front wall of encapsulation material, a core layer, and a back wall of encapsulation material, and a layer of encapsulation material covering the top and the bottom of the core layer. Thus, for such a cleat member, the thickness of the cleat member would include a first thickness of the encapsulation layer (i.e. the thickness of the front wall) plus the thickness of the core layer plus a second thickness of the encapsulation layer (i.e. the thickness of the back wall). The thickness of the front wall may be the same or different than the thickness of the back wall. The encapsulation layer may substantially encapsulate the core layer, i.e. the outer layer may mostly, but not completely, cover the inner layer.

The phrase "core layer," as used herein, refers to a stratum that is generally contiguous with the encapsulation layer and is at least partially encapsulated by the encapsulation layer. The core layer may be formed as a monolithic, single element. Alternatively, the core layer may be formed as multiple, contiguous elements or may be formed as multiple, non-contiguous elements. Further, the core layer and its core element(s) may be formed of one or more distinct materials. As defined above, the core layer is formed of material(s) distinct from the material of the encapsulation layer.

The core layer is formed of material(s) distinct from the material that forms the encapsulation layer. The phrase "distinct materials," as used herein, refers to materials having measurably distinct or different properties. By way of non-limiting example, a first material may be a thermoplastic polyurethane (TPU), and a second material, distinct from the first material, may be a nylon (or vice versa). By way of another non-limiting example, a first material may be a TPU, and a second material, distinct from the first material, may also include TPU, but with the addition of an additive, such as perfluoropolyether (PFPE), or a filler, such as a fiber reinforcement. Fiber reinforcement may include glass, carbon (including graphite), aramid, boron, basalt, metallic, etc. fibers. In generally, the fibers will be chopped. Typically, the higher the weight percent of fiber reinforcement in a given matrix material, the stiffer the material (and the greater the density.) For certain sports or athletic endeavors, from approximately 5 to 50 weight percent of glass-fiber reinforcement would most likely be sufficient, while from approximately 15 to 30 weight percent of glass-fiber reinforcement may be preferable. Other types of fiber reinforcements would typically have other optimum weight percentages, depending upon the sports application and the details of the cleat member design.

By way of another non-limiting example, the first material may be a clear TPU and the second material, distinct from the first material, may include the same basic TPU as the first material, but with the addition of a colorant or other visual admixture component. Thus, in one aspect, otherwise identical materials having different colors, such that they are visually distinguishable, may be considered "distinct materials." The term "translucent," as used herein, means allowing light to pass through. Translucent materials may be colored or tinted, clear or substantially clear. The term "colored," as used herein, means not clear. Thus, a red-tinted translucent material is colored, as is a white opaque material.

In one aspect, an aperture 30 is defined by encapsulation layer 24 or core layer 26 or both. The term "aperture," as used herein, refers to a volume between opposing surfaces in a layer, which volume is devoid of the material that forms that layer. An aperture may be a gap, a cavity, an opening, a hole, an orifice, a slot, a crack, a slit, etc., in a layer. With respect to the core layer, the aperture may be formed within a core element or between core elements. The cross-sectional area of the aperture may be regularly defined, such as by a circle, hemisphere or other sector, triangle, hexagon, star, etc., or may be irregularly defined. The cross-sectional area of the aperture need not be constant. An aperture may be formed completely within a layer or element, may extend to one or more boundary surfaces of the layer or the element or may be formed between adjacent elements. An aperture may be a "through aperture," meaning that the space (gap, opening, hole, orifice, slot, crack, slit, etc.) extends completely through the thickness of the layer. Alternately, an aperture, such as a cavity or a non-through hole, may extend only partway through the thickness of the layer. Furthermore, an aperture defined in an element or in a layer may be filled or partially filled with material from another layer. In other words, an aperture in a core layer needs to be devoid of core layer material(s), but need not be empty space. The volume, space, gap, opening etc. that defines an aperture in a core layer could be filled or partially filled with material from another layer.

Figure 6:
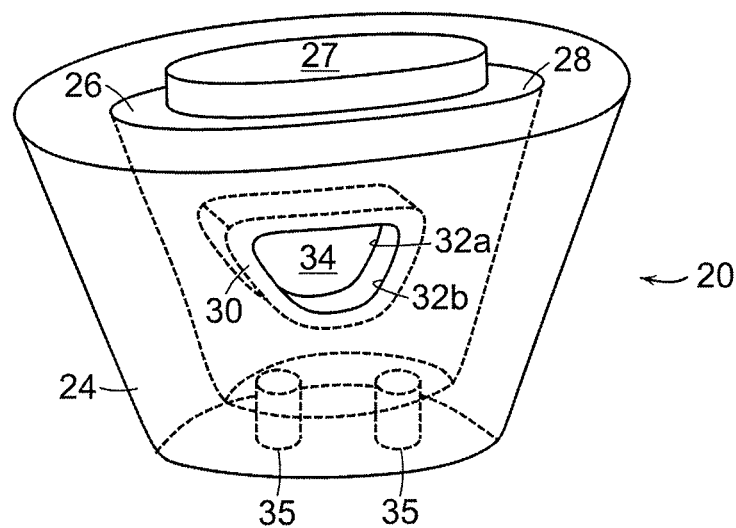
FIG. 6 is a perspective view of a cleat member according to an embodiment of the present invention.
Figure 7A:
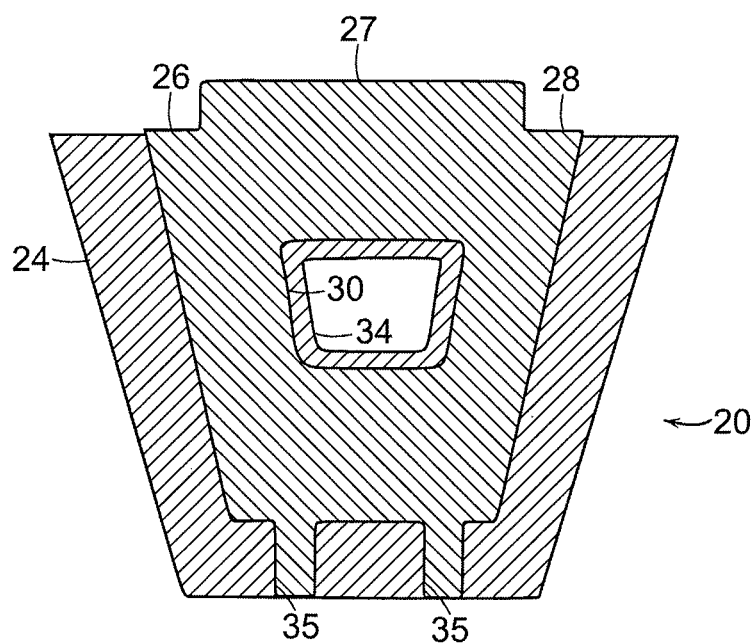
FIG. 7A is a first section view of the cleat member of FIG. 6.
Figure 7B:
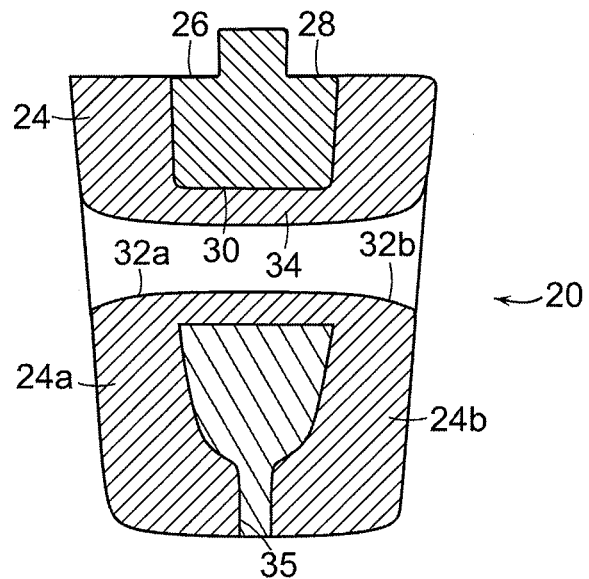
FIG. 7B is a second section view of the cleat member of FIG. 6.

FIGS. 6 and 7A-7B illustrate one embodiment of cleat member 20, wherein core layer 26 is formed of a single core element 28. Core layer 26 is substantially encapsulated by encapsulation layer 24. In this embodiment, the top surface of core layer 26 is not covered by encapsulation layer 24. An aperture 30, which in this embodiment is a roughly-trapezoidal through hole, extends through the thickness of core layer 26. In this particular embodiment, encapsulation layer 24 also defines apertures 32a and 32b, which also have roughly trapezoidal cross-sectional shapes. Apertures 32a and 32b are through holes extending through encapsulation layer 24, i.e. aperture 32a extends through a front wall 24a formed by encapsulation layer 24 and aperture 32b extends through a back wall 24b formed by encapsulation layer 24. In this particular embodiment, aperture 34, which includes apertures 32a, 32b, also extends entirely through cleat member 20, i.e. aperture 34 not only extends through a front wall 24a formed by encapsulation layer 24, but also extends through the thickness of core layer 26 and through the back wall 24b formed by encapsulation layer 24. Apertures 32a, 32b and 34 are substantially coaxially aligned with aperture 30 and have a smaller cross-sectional area than aperture 30, such that the encapsulation material of encapsulation layer 24 extends into, and partially fills, the volume defined by aperture 30.

In general, an aperture 32 need not be aligned with aperture 30. And, aperture 32 and aperture 30 need not have identically-shaped cross-sections. Further, an aperture 32 extending through the encapsulation layer 24 need not extend through both front wall 24a and back wall 24b of encapsulation layer 24. In other words, an aperture that extends through encapsulation layer need only extend through the thickness of one wall of the encapsulation layer.

FIGS. 6, 7A and 7B also illustrate vents 35 that have been provided in encapsulation layer to facilitate subsequent filling of the encapsulation layer with the material of core layer 26. When vents 35 are provided, it is expected that the material of the core layer will fill, or substantially fill, these holes.

Figure 8B:
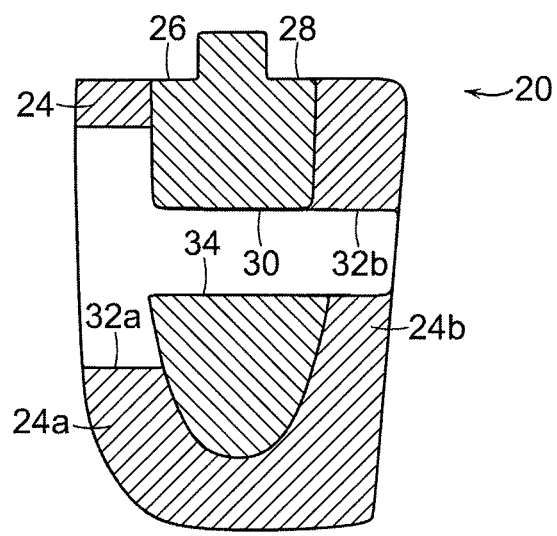
FIG. 8B is a second section view of the cleat member of FIG. 8A.
Figure 8A:
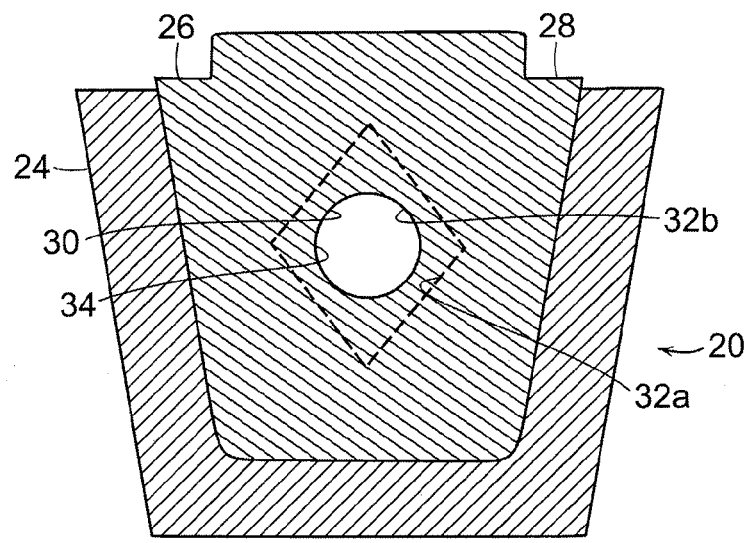
FIG. 8A is a first section view of a cleat member according to another embodiment of the present invention.

FIGS. 8A and 8B illustrate another embodiment of cleat member 20, similar to the embodiment of FIGS. 6 and 7A-7B, in that encapsulation layer 24 has an aperture 32 and core layer 26 has an aperture 30. In this embodiment, the material of encapsulation layer 24 does not extend into aperture 30. Aperture 30 is shown as a circular through hole. A dashed line (item 32a) represents one possible shape of aperture 32 in encapsulation layer 24. Alternatively, as best shown by aperture 32b in FIG. 8B, aperture 32 could be coextensive with aperture 30.

Figure 9A:
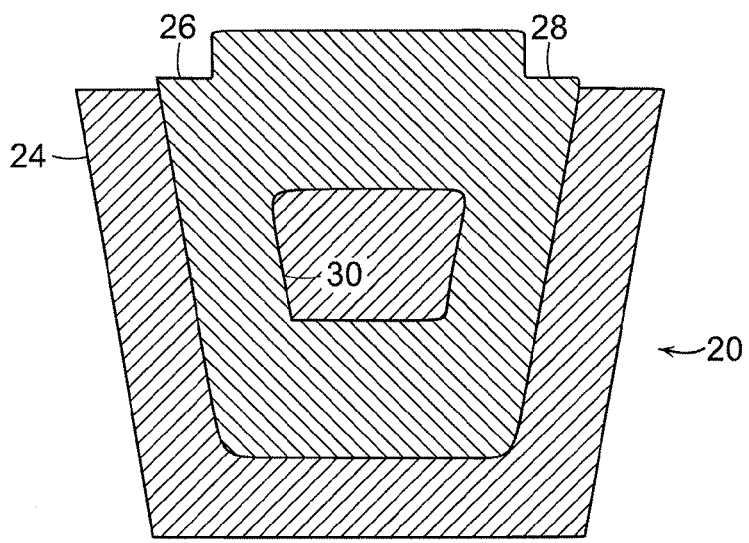
FIG. 9A is a first section view of a cleat member according to yet another embodiment of the present invention.
Figure 9B:
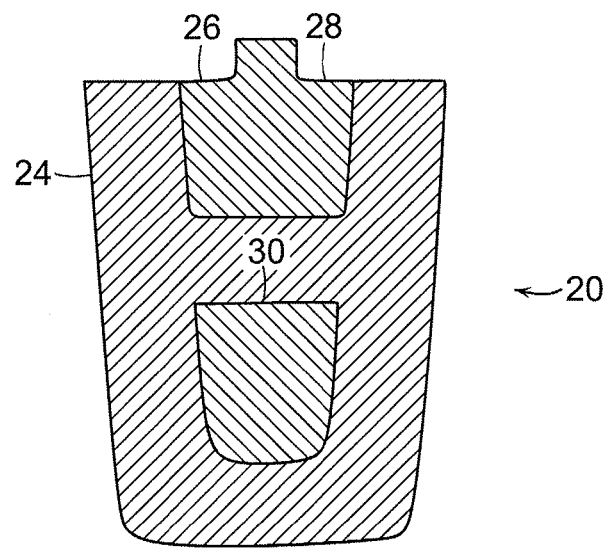
FIG. 9B is a second section view of the cleat member of FIG. 9A.

FIGS. 9A and 4B also illustrate another embodiment of cleat member 20, similar to the embodiment of FIGS. 6 and 7A-7B, except that cleat member 20 is not provided with either an aperture 32 in encapsulation layer 24 or a through-the-thickness aperture 34 in cleat member 20. In this embodiment, the encapsulation material of encapsulation layer 24 extends into aperture 30 and completely fills aperture 30.

Figure 10B:
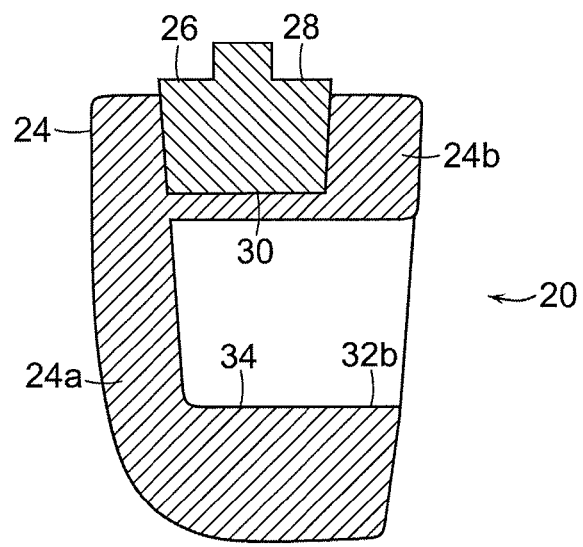
FIG. 10B is a second section view of the cleat member of FIG. 10A.
Figure 10A:
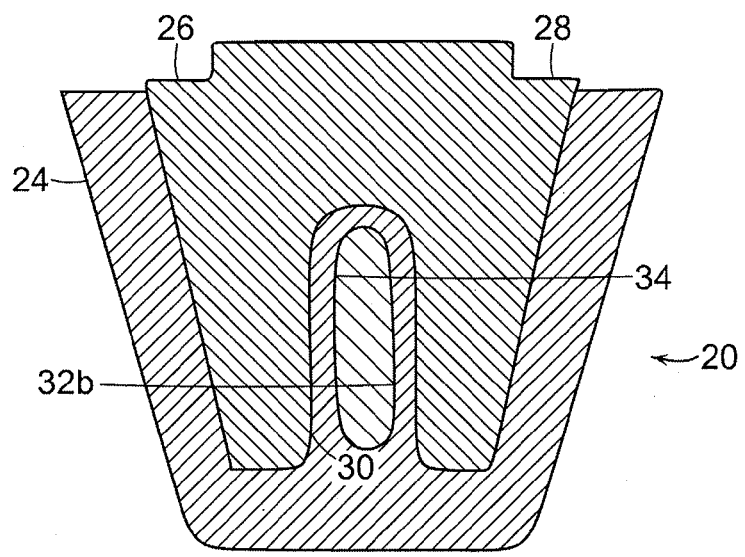
FIG. 10A is a first section view of a cleat member according to even another embodiment of the present invention.

FIGS. 10A and 10B illustrate an embodiment of cleat member 20 wherein aperture 30 of core layer 26 is an open slot, i.e. a slot that extends to the bottom edge of core element 28. As non-limiting alternative examples (not shown), core layer could include an open slot aperture that extends to a side edge of the core element or core layer could include a plurality of open slot apertures, with one open slot extending to a first side edge and a another open slot extending to a second, opposite, side edge. As shown in FIG. 10B, aperture 30 extends through the thickness of the core layer. Encapsulation layer 24 also defines a slot-shaped aperture 32b, which in this embodiment is a closed slot, i.e. a slot that does not extend to an edge of the encapsulation layer. Alternatively, aperture 32 could be a circular through hole or any other suitable cross-sectional shape. In this embodiment, cleat member 20 has an aperture 34 that extends partially through cleat member 20. Specifically, aperture 34, which includes through aperture 32a, extends through the core layer and through a back wall 24b of encapsulation layer 24, but not through a front wall 24a of encapsulation layer 24. The encapsulation material of encapsulation layer 24 extends into aperture 30 and partially fills aperture 30. Alternatively, similar to the embodiment of FIGS. 9A-9B, encapsulation layer 24 could completely fill the volume defined by aperture 30, i.e. encapsulation layer 24 would have no aperture (not shown).

Figure 11:
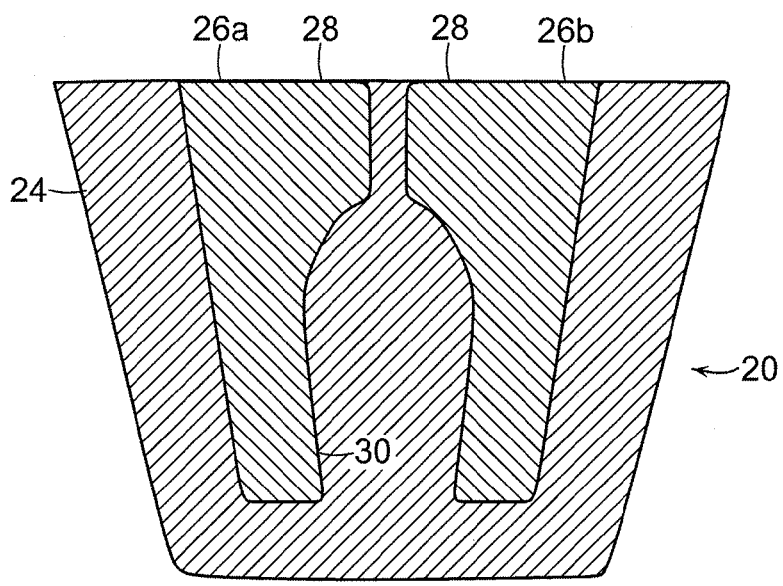
FIG. 11 is a section view of a cleat member according to a further embodiment of the present invention.

FIG. 11 illustrates an embodiment of cleat member 20, wherein core layer 26 is formed in two parts, 26a and 26b, each part being formed from a core element 28. Core layer 26 defines aperture 30 between two opposing surfaces of adjacent core elements 30. In this illustration, core elements 28 are adjacent one another, but not touching.

Figure 12:
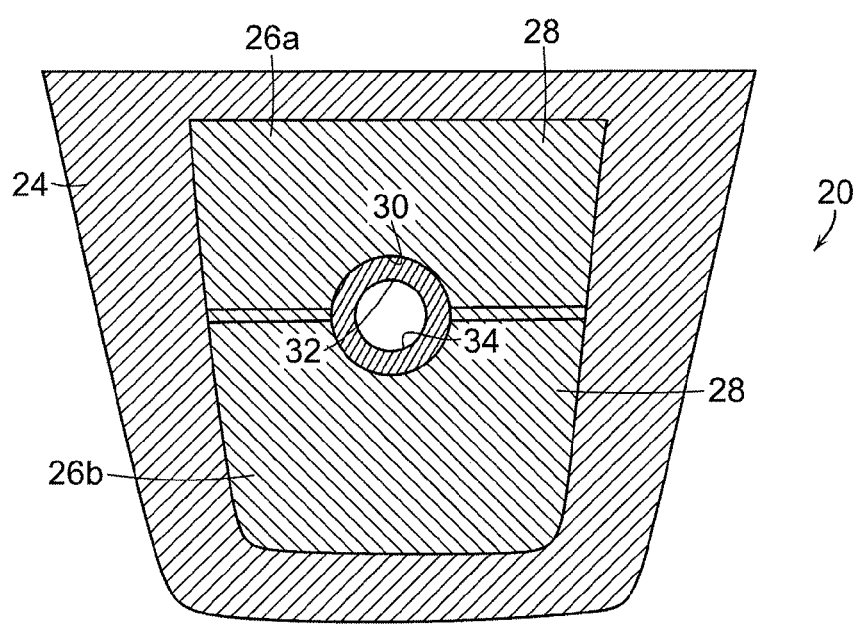
FIG. 12 is a section view of a cleat member according to even a further embodiment of the present invention.

Alternatively, core elements 28 could be contiguous, as shown in FIG. 12. Core layer portions 26a and 26b contact one another. Aperture 30 is formed as a circular through hole between the two core elements. Further, encapsulation layer 24 includes a circular through hole aperture 32, which is coaxial with aperture 30. Encapsulation material partially fills the volume defined by aperture 30.

Thus, it is to be appreciated that core layer 26 may be formed of one or more core elements, that core elements may be joined to one other, touching one another, or not touching one another. Further, it is to be appreciated that core elements could be formed of the same or distinct materials. Thus, by way of a non-limiting example, cleat member 20 could include a core layer 26 formed of three side-by-side core elements 28, wherein the outer two core elements 28 are formed of a first material and the centrally disposed core element 28 is formed of a second material. The first material may be a red-colored TPU; the second material may be a black-colored TPU. Alternatively, the first material may be a red-colored nylon having a 30 to 35 wt. % glass-fiber reinforcement, while the second material may be a red-colored nylon having a 40 to 50 wt. % glass-fiber reinforcement.

As the core element(s) 28 form the core layer 26, they collectively form a stratum that is generally contiguous with the encapsulation layer and is at least partially encapsulated by the encapsulation layer. The material of each of the core elements 28 is distinct from the material that forms the encapsulation layer 24.

Figure 13A:
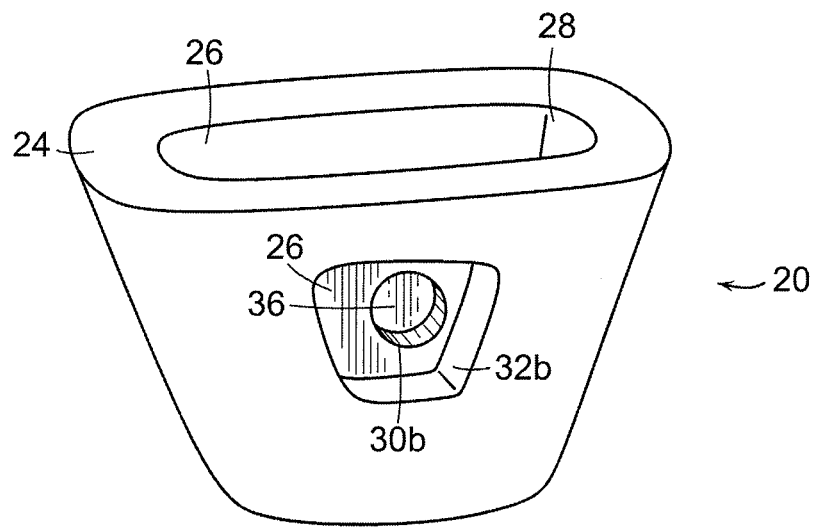
FIG. 13A is a perspective view of a cleat member according to another embodiment of the present invention.
Figure 13B:
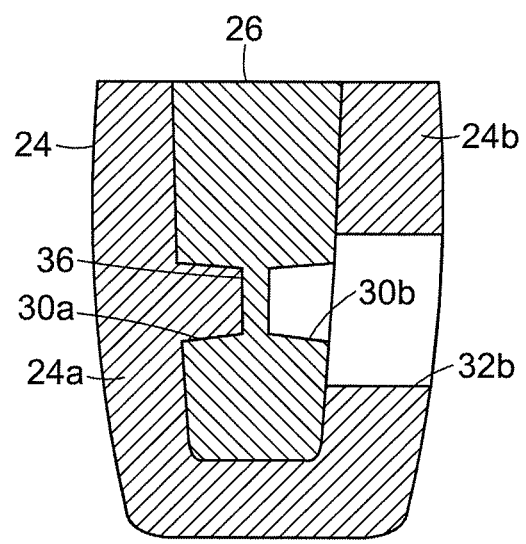
FIG. 13B is a section view of the cleat member of FIG. 13A.

FIGS. 13A-13B illustrate even another embodiment of cleat member 20 wherein core layer 26 includes an aperture which does not extend all the way through the thickness of layer 26 (i.e. a non-through hole or cavity-type aperture). As shown in FIG. 13B, core layer 26 could have two opposing apertures 30a, 30b extending inwardly from two opposing walls of core layer 26 such that web 36 forms the back wall of both apertures. Encapsulation layer 24 may have an aperture 32b formed in back wall 24b. In this embodiment, no encapsulation material resides within the volume defining aperture 30b. Alternatively, encapsulation layer 24 may have no aperture (as shown with respect to front wall 24a) and encapsulation material from encapsulation layer 24 may fill the volume formed by non-through hole aperture 30a. As another alternative, encapsulation material may partially fill the volume formed by non-through hole aperture 30 (not shown).

Figure 14:
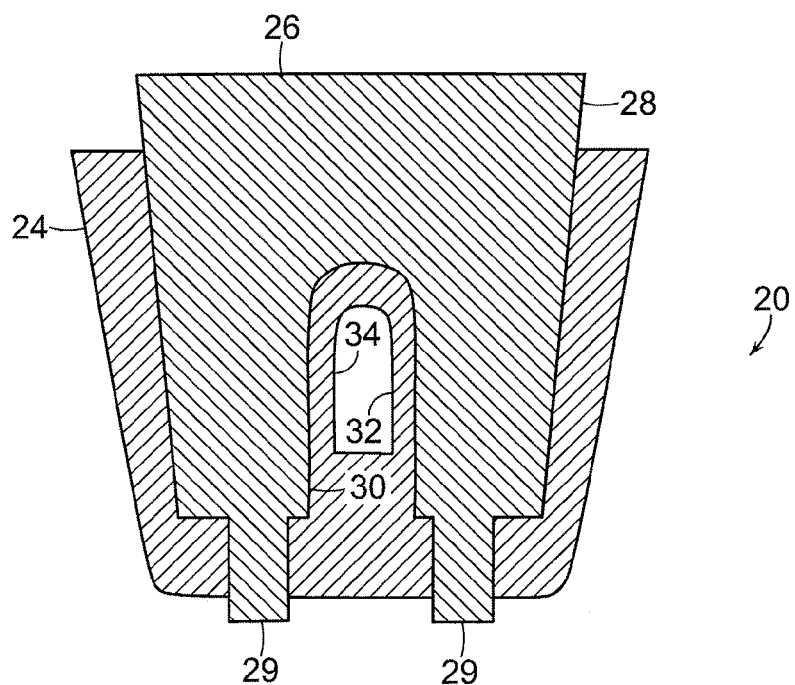
FIG. 14 is a first section view of a cleat member according to even another embodiment of the present invention.

FIG. 14 shows an embodiment wherein aperture 30 of core layer 26 is an open slot, i.e. a slot that extends to the bottom edge of core element 28 and through the thickness of the core layer. Encapsulation layer 24 defines an aperture 32 which extends through both the front and back walls of the encapsulation layer. Aperture 32 is shown as having a rounded upper edge and a squared off lower edge. Thus, in this embodiment, cleat member 20 has an aperture 34 that extends completely through cleat member 20 and is coextensive with aperture 32. The encapsulation material of encapsulation layer 24 extends into aperture 30 and partially fills aperture 30. FIG. 14 also illustrates legs 29 that have been provided by core layer 26. Legs may extend beyond the bottom edge of encapsulation layer, be substantially flush with the bottom edge, or reside completely within the encapsulation layer. When legs 29 extend to the bottom edge or beyond, they may provide a wear resistant surface for contacting the ground. Further, when legs 29 extend beyond the bottom edge (as shown in FIG. 14), they may act like mini cleats, providing an extra measure of traction. FIG. 14 also illustrates that core layer 26 may extend beyond the top edge of encapsulation layer, which may facilitate attaching cleat member 20 to an article of footwear.

Referring back to FIGS. 1-3, cleat members 20 and/or cleat member assemblies 22 are engaged to an article of footwear. Individual cleat members may be attached directly to the sole of an article of footwear. To facilitate attachment, individual cleat members may be formed (for example by co-molding) or otherwise attached to individual mounting plates. Alternatively, cleat member assemblies may be formed by assembling individual cleat members 20 to a common cleat member assembly plate. Alternatively, cleat member assemblies may be formed by co-molding the cleat members with the cleat member assembly plate. Thus, it is to be appreciated that a plurality of cleat members 20 may share a single mounting plate, each cleat member 20 could have its own mounting plate, or each cleat member 20 could be mounted directly to sole 14.

The mounting plate or the cleat member assembly plate may further include strengthening or stiffening elements. For example, a bridge may be formed between two adjacent cleat members to provide additional stiffness.

An exemplary method for producing cleat member 20 is described. The encapsulation layer 24 may be produced first, for example, by injection molding. By way of non-limiting example, the encapsulation material may be a clear thermoplastic polyurethane (TPU). The encapsulation layer will be formed with a cavity for subsequent filling with a core material. The encapsulation layer may be designed, at least in part, with consideration of any of various mold processing parameters. For example, mold angles may be provided to facilitate the release of the layer from the mold and/or vent holes may be provided to facilitate the subsequent core molding process.

Next, the cavity of the encapsulation layer is filled with core material. By way of non-limiting example, the core material may be a colored, glass-reinforced nylon or TPU material. The holes in the bottom of the encapsulation layer may allow for venting and completely filling of the cavity by the core material. In one embodiment, the encapsulation material(s) and the core material(s) will provide a strong and stable bond therebetween, such as a chemical bond.

Alternatively, cleat member 20 may be formed by first molding the core layer and subsequently overmolding the encapsulation layer. As even another alternative, the core layer and the encapsulation layer could be molded independently, with the core layer subsequently inserted into the encapsulation layer. The core layer may be adhesively bonded, or otherwise joined, to the encapsulation layer. It is to be appreciated that processes other than molding (as a non-limiting example, extrusion) may be used to form the core layer and/or the encapsulation layer.

If a cleat member assembly 22 is being formed, in one embodiment, the common cleat member plate may be formed of the same material as the encapsulation layer. In this case, it may be possible to co-mold the common cleat member plate with the encapsulation layer for multiple cleat members 20. Thus, the mold for the encapsulation layer 24 may include a mold relief for the common cleat member assembly plate, such that multiple cleat member encapsulation layers and the common cleat member assembly plate may be formed at the same time. In another embodiment, the common cleat member plate may be formed of the same material as the core layer 26. Thus, the mold for the core material molding step may include a mold relief for the assembly plate.

Similarly, if a cleat member frame 16 is being formed, by way of a non-limiting example, the frame portions may be formed of the same material as the encapsulation layer 24. In this case, it may be possible to co-mold the cleat member frame with the encapsulation layer 24 for multiple cleat members 20. Thus, the mold for the encapsulation layer may include a mold relief for the frame portions, such that multiple cleat member encapsulation layers and the cleat member frame 16 may be formed at the same time. In another embodiment, the frame portions may be formed of the same material as the core layer 26. Thus, the mold for the core material molding step may include a mold relief for the frame portions.

Cleat members 20, cleat member assemblies 22 and/or cleat member frame 16 are attached to sole 14. Protrusion or boss 27 may assist in the engagement, in which case, corresponding a channel or recess would be provided in sole 14. Alternatively, a protrusion may be provided on the sole, with the cleat member providing the corresponding channel or recess. By way of non-limiting example, cleat members 20, cleat member assemblies 22 and/or cleat member frame 16 may be secured to sole 14 by an adhesive. When using an adhesive, a primer may be used as well. Mechanical fastening elements may also be used to attach cleat members 20 to sole 14. Thus, by way of non-limiting examples, a metal screw, a threaded inserted, a snap-in fastener, etc. may be embedded in or otherwise attached to the top portion of cleat member 20. A complementary fastening element may be provided in sole 14, such that cleat member 20 may be threaded, snapped, etc. onto sole 14. Other suitable methods for attaching cleat members 20 to sole 14 will be apparent to persons of ordinary skill in the art, given the benefit of this disclosure.

In one aspect, cleat members 20, cleat member assemblies 22 and/or cleat member frame 16 are attached to a relatively thin, stiff base plate 18. In one embodiment, base plate 18 is formed of a composite material. The composite material could be, for example, a fiber-reinforced thermoplastic resin layup. By way of non-limiting example, the fiber could include carbon, aramid, glass, boron, basalt, metallics and/or a combination thereof. The fiber could be unidirectional woven or non-woven, random fiber orientations, or chopped depending upon the application and the desired stiffness and strength characteristics. Further, the fiber could be supplied pre-pregnated or dry. The cleat members, cleat member assemblies and/or cleat member frame may be placed in a mold with the fiber material, such that the cleat members are molded to the base plate. In another embodiment, base plate 18 could be formed of a thin metal or a plastic (without reinforcement). Non-limiting examples of such plastics include thermoplastic TPU or nylon.

An exemplary cleat member is described in detail. A cleat member is provided with a clear encapsulation layer and a red core layer. The red core layer is made from a glass-reinforced nylon or TPU material. The weight percent of the glass-reinforcement may be in the range of approximately 5 to 50%. Optionally the weight percent of the glass-reinforcement may be in the range of approximately 15 to 30%. The clear encapsulation layer is a TPU. The encapsulation layer surrounds all sided of the core layer and enclosed the bottom of the core layer. The top of the core layer is not covered by the encapsulation layer. A hole is provided through the thickness of the core layer. The hole is roughly triangular in shape. A second hole, substantially coaxial with the hole through the core layer, extends completely through the front wall of the encapsulation layer and a third hole, substantially coaxial with the hole through the core layer, extends completely through the back wall of the encapsulation layer. These second and third holes are also roughly triangular in shape, with the second hole having a cross-section area smaller that the hole of the core layer and the third hole having a cross-section area larger than the hole of the core layer. As these three holes are coaxially aligned, they form an aperture that extends completely through the cleat member. The aperture through cleat member 20 reduces weight and provides an interesting aesthetic appearance.

In operation, the previously described features, individually and/or in any combination, improve stability and traction control, which are important in sports needing cleated footwear. While the various features of cleated article of footwear 10 operate work together to achieve the advantages previously described, it is recognized that individual features and sub-combinations of these features can be used to obtain some of the aforementioned advantages without the necessity to adopt all of these features.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. A cleat member for use with an article of footwear, the cleat member having side wall surfaces extending upward from a ground-engaging surface, the cleat member comprising:
    an outer layer formed from a first material;
    an inner layer formed from a second material,
        said inner layer having upwardly extending side surfaces that are at least partially encapsulated by said outer layer, and
        said first material being distinct from said second material; and
    a hole extending completely through said cleat member and through said inner layer from a first side wall surface to a second side wall surface in a thickness direction of the cleat member, said hole being visible when said cleat member is joined to an article of footwear,
    wherein said cleat member is configured to project on all sides from a bottom surface of the article of footwear.

2. The cleat member of claim 1, wherein said first material is a translucent thermoplastic polyurethane and wherein said second material is one of a colored thermoplastic polyurethane and a colored nylon.

3. The cleat member of claim 1, wherein said second material includes from approximately 5 to 50 wt. % glass fiber, inclusive.

4. A cleat member for use with an article of footwear, the cleat member extending in an upward direction from a bottom ground-engaging surface toward a top mounting surface, the cleat member comprising:
    an encapsulation layer formed from an encapsulation material, said encapsulation layer having upwardly extending side walls; and
    at least one core element formed from one or more core materials, said at least one core element forming a core layer, said core layer having upwardly extending side surfaces,
        said core layer side surfaces at least partially encapsulated by said encapsulation layer,
        each of said one or more core materials being distinct from said encapsulation material, and
    wherein at least one of said encapsulation layer and said core layer defines a first aperture,
    wherein said first aperture extends through at least one of a side wall of said encapsulation layer and a side surface of said core layer in a thickness direction of the cleat member, said aperture being visible when said cleat member is joined to an article of footwear, and
    wherein the top mounting surface of said cleat member is configured to be secured to the article of footwear.

5. The cleat member of claim 4, wherein said first aperture is a hole extending through said core layer.

6. The cleat member of claim 4, wherein said first aperture is a hole extending through said encapsulation layer.

7. The cleat member of claim 4, wherein said first aperture extends completely through said cleat member.

8. The cleat member of claim 5, wherein a second aperture is a hole extending through said encapsulation layer and substantially coaxially aligned with said first aperture.

9. The cleat member of claim 5, wherein said first aperture is at least partially filled with said encapsulation material.

10. The cleat member of claim 4, wherein said core layer is substantially encapsulated by said encapsulation layer.

11. The cleat member of claim 4, wherein said encapsulation material is a translucent thermoplastic polyurethane and wherein at least one of said one or more core materials is one of a colored thermoplastic polyurethane and a colored nylon.

12. The cleat member of claim 4, wherein at least one of said one or more core materials includes from approximately 5 to 50 wt. % glass fiber, inclusive.

13. The cleat member of claim 4, wherein at least one of said one or more core materials includes from approximately 15 to 30 wt. % glass fiber, inclusive.

14. The cleat member of claim 4, wherein said core layer is monolithic.

15. An article of footwear comprising:
    an upper;
    a sole attached to the upper; and
    at least one cleat member extending from the sole, the cleat member having a side wall surface extending upward from a ground-engaging surface, the cleat member including:
        an outer layer formed from a first material;
        an inner layer formed from a second material,
            said inner layer having an upwardly extending side surface that is at least partially encapsulated by said outer layer, and
            said first material being distinct from said second material; and
        a hole extending in a thickness direction of the cleat member through said outer layer, said hole being visible when said cleat member is joined to the article of footwear,
    wherein the thickness of the cleat member is less than a width of the sole.

16. The article of footwear of claim 15, wherein said first material is a translucent thermoplastic polyurethane, and wherein said second material includes one of a colored thermoplastic polyurethane and a colored nylon.

17. The article of footwear of claim 15, wherein said second material includes from approximately 5 to 50 wt. % glass fiber, inclusive.

18. A ground engaging member for use with an article of footwear, the ground engaging member comprising:
- a cleat member assembly plate in the shape of at least a portion of a footprint;
- a cleat frame configured to extend generally around at least a portion of said cleat member assembly plate, said cleat member assembly plate and said frame configured to be joined to a sole of an article of footwear;
- at least one cleat member extending from said cleat member assembly plate, the cleat member including:
  - an outer layer formed from a first material;
  - an inner layer formed from a second material,
    - said inner layer having an upwardly extending side surface that is at least partially encapsulated by said outer layer, and
    - said first material being distinct from said second material;
  - a side wall surface extending downward toward a ground-engaging surface; and
  - a hole extending at least partially through at least one of said outer layer and said inner layer in a direction transverse to the side wall surface, said hole being visible when said cleat member assembly plate is joined to an article of footwear.

19. The ground engaging member of 18, wherein said hole extends completely through said cleat member.

20. The ground engaging member of claim 18, wherein said first material is a translucent thermoplastic polyurethane, and wherein said second material includes one of a colored thermoplastic polyurethane and a colored nylon.

21. The ground engaging member of claim 18, wherein said second material includes from approximately 5 to 50 wt. % glass fiber, inclusive.

22. The ground engaging member of claim 18, wherein said cleat frame base is co-molded with said outer layer of said cleat member or said inner layer of said cleat member.

23. An article of footwear comprising:
- an upper; and
- a sole, the sole including the ground engaging member of claim 18.

* * * * *